United States Patent
Oggier et al.

(10) Patent No.: US 10,955,555 B2
(45) Date of Patent: Mar. 23, 2021

(54) DEPTH SENSOR COMBINING LINE TRIANGULATION AND TIME OF FLIGHT

(71) Applicant: Apple Inc., Cupertino, CA (US)

(72) Inventors: Thierry Oggier, San Jose, CA (US); Scott T. Smith, San Jose, CA (US); Andrew Herrington, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/538,864

(22) Filed: Aug. 13, 2019

(65) Prior Publication Data

US 2019/0361127 A1 Nov. 28, 2019

Related U.S. Application Data

(63) Continuation of application No. 15/700,231, filed on Sep. 11, 2017, now Pat. No. 10,436,910.

(Continued)

(51) Int. Cl.

| | |
|---|---|
| *G01S 7/4865* | (2020.01) |
| *G01S 17/89* | (2020.01) |
| *G01S 17/06* | (2006.01) |
| *G06T 7/521* | (2017.01) |
| *H04N 13/128* | (2018.01) |
| *H04N 13/296* | (2018.01) |
| *H04N 13/254* | (2018.01) |
| *H04N 13/271* | (2018.01) |

(Continued)

(52) U.S. Cl.
CPC ............ *G01S 17/89* (2013.01); *G01S 7/4817* (2013.01); *G01S 7/4865* (2013.01); *G01S 17/06* (2013.01); *G01S 17/42* (2013.01); *G01S 17/48* (2013.01); *G06T 7/521* (2017.01); *H04N 13/128* (2018.05); *H04N 13/254* (2018.05); *H04N 13/271* (2018.05); *H04N 13/296* (2018.05); *G01S 7/4815* (2013.01); *G01S 7/4863* (2013.01)

(58) Field of Classification Search
CPC .................................................... G01S 7/4865
See application file for complete search history.

(56) References Cited

U.S. PATENT DOCUMENTS 10,215,857 B2 * 2/2019 Oggier .................. G01S 7/4816
10,574,973 B2 * 2/2020 Hall .......................... G01S 7/02
(Continued)

OTHER PUBLICATIONS

U.S. Appl. No. 16/045,770 office action dated Jan. 3, 2020.

*Primary Examiner* — Gary C Vieaux
(74) *Attorney, Agent, or Firm* — Kligler & Associates Patent Attorneys Ltd

(57) ABSTRACT

Optical apparatus includes a projector, which directs a sequence of pulses of radiation toward a scene so as to form one or more lines of the radiation on the scene. A receiver includes an array of single-photon detectors, which output, in response to the radiation that is incident thereon, signals indicative of a time-of-flight of the pulses from the projector to the receiver via the points in the scene, and collection optics, which form an image the scene on the array, including the one or more lines of the radiation, such that each single-photon detector receives the radiation reflected from a corresponding point in the scene. A processor receives the signals output by the sensing elements, and derives depth coordinates of the points in the scene from both the time-of-flight of the pulses and triangulation of the one or more lines in the image.

10 Claims, 4 Drawing Sheets

Related U.S. Application Data

(60) Provisional application No. 62/396,838, filed on Sep. 20, 2016.

(51) Int. Cl.
  G01S 7/481 (2006.01)
  G01S 17/42 (2006.01)
  G01S 17/48 (2006.01)
  G01S 7/4863 (2020.01)

(56) References Cited

U.S. PATENT DOCUMENTS

| | | | | |
|---|---|---|---|---|
| 10,605,920 | B2* | 3/2020 | Liu | G01S 7/497 |
| 2006/0192086 | A1* | 8/2006 | Niclass | H01L 31/107 |
| | | | | 250/214.1 |
| 2007/0182949 | A1* | 8/2007 | Niclass | G01S 7/491 |
| | | | | 356/3 |
| 2016/0306044 | A1* | 10/2016 | Smits | G01S 17/66 |
| 2017/0026633 | A1 | 1/2017 | Riza | |

* cited by examiner

DEPTH SENSOR COMBINING LINE TRIANGULATION AND TIME OF FLIGHT

CROSS-REFERENCE TO RELATED APPLICATION

This application is a continuation of U.S. patent application Ser. No. 15/700,231, filed Sep. 11, 2017, which claims the benefit of U.S. Provisional Patent Application 62/396,838, filed Sep. 20, 2016, which is incorporated herein by reference.

FIELD OF THE INVENTION

The present invention relates generally to optical systems, and particularly to optical depth mapping.

BACKGROUND

Existing and emerging consumer applications have created an increasing need for real-time three-dimensional (3D) imagers. These imaging devices, also commonly known as depth sensors, 3D mappers, or depth mappers, enable the remote measurement of distance (and often intensity) of each point on a target scene—so-called target scene depth—by illuminating the target scene with one or more optical beams and analyzing the reflected optical signal.

A commonly used technique for determining the distance to each point on the target scene involves sending a pulsed optical beam towards the target scene, followed by the measurement of the round-trip time, i.e. time-of-flight, taken by the optical beam as it travels from the source to target scene and back to a detector adjacent to the source.

Another commonly used technique is based on projecting a pattern of structured light onto a scene and capturing an image of the projected pattern. The pattern may comprise, for example, single or multiple spots of light or single or multiple lines of light. The pattern may be either stationary or scanned across the target scene. The distance to each point in the scene is derived from the local displacement of the pattern.

SUMMARY

Embodiments of the present invention that are described herein provide improved apparatus and methods for optical depth sensing.

There is therefore provided, in accordance with an embodiment of the invention, optical apparatus, including a scanning line projector, which is configured to scan a line of radiation across a scene. A receiver includes an array of sensing elements, which are configured to output signals in response to the radiation that is incident thereon, and collection optics configured to image the scene onto the array, such that each sensing element receives the radiation reflected from a corresponding point in the scene. A processor is coupled to receive the signals output by the sensing elements, to identify respective times of passage of the scanned line across the points in the scene by comparing a time-dependent waveform of the signals from the corresponding sensing elements to an expected waveform, and to derive depth coordinates of the points in the scene from the respective times of passage.

In one embodiment, the processor includes distributed processing components that are integrated with the sensing elements.

In some embodiments, comparing the time-dependent waveform of the signals to the expected waveform includes comparing a temporal duration of the signals to an expected temporal duration. Additionally or alternatively, comparing the time-dependent waveform of the signals to the expected waveform includes calculating a correlation value between the time-dependent waveform of the signals and the expected waveform.

In a disclosed embodiment, the processor is configured to derive the depth coordinates of the points in the scene by triangulation, using the respective times of passage and angles of transmission and reception of the radiation from the scanning line projector to the sensing elements via the scene.

In some embodiments, the sensing elements include single-photon detectors. Typically, the scanning line projector is configured to emit the radiation as a sequence of short pulses having a pulse duration shorter than the expected waveform, and the signals output by the sensing elements are indicative of a time-of-flight of the pulses from the scanning line projector to the receiver via the points in the scene. In one embodiment, the processor is configured to derive the depth coordinates of the points in the scene from both the respective times of passage of the scanned line across the points in the scene and the time-of-flight.

In a disclosed embodiment, the scanning line projector is configured to scan multiple parallel lines of radiation across respective parts of the scene, and the processor is configured to receive and process the signals output by the sensing elements in order to identify the respective times of passage of the multiple lines across the points in the scene.

Typically, the scanning line projector is configured to scan the line of radiation across the scene in a scan direction perpendicular to the line.

In some embodiments, the processor is configured to construct a depth map of the scene using the derived depth coordinates.

There is also provided, in accordance with an embodiment of the invention, a method for sensing, which includes scanning a line of radiation across a scene, and imaging the scene onto an array of sensing elements, such that each sensing element receives the radiation reflected from a corresponding point in the scene. Signals output by the sensing elements in response to the radiation that is incident thereon are received, and respective times of passage of the scanned line across the points in the scene are identified by comparing a time-dependent waveform of the signals from the corresponding sensing elements to an expected waveform. Depth coordinates of the points in the scene are derived from the respective times of passage.

The present invention will be more fully understood from the following detailed description of the embodiments thereof, taken together with the drawings in which:

DETAILED DESCRIPTION OF EMBODIMENTS

Overview

Figure 1:
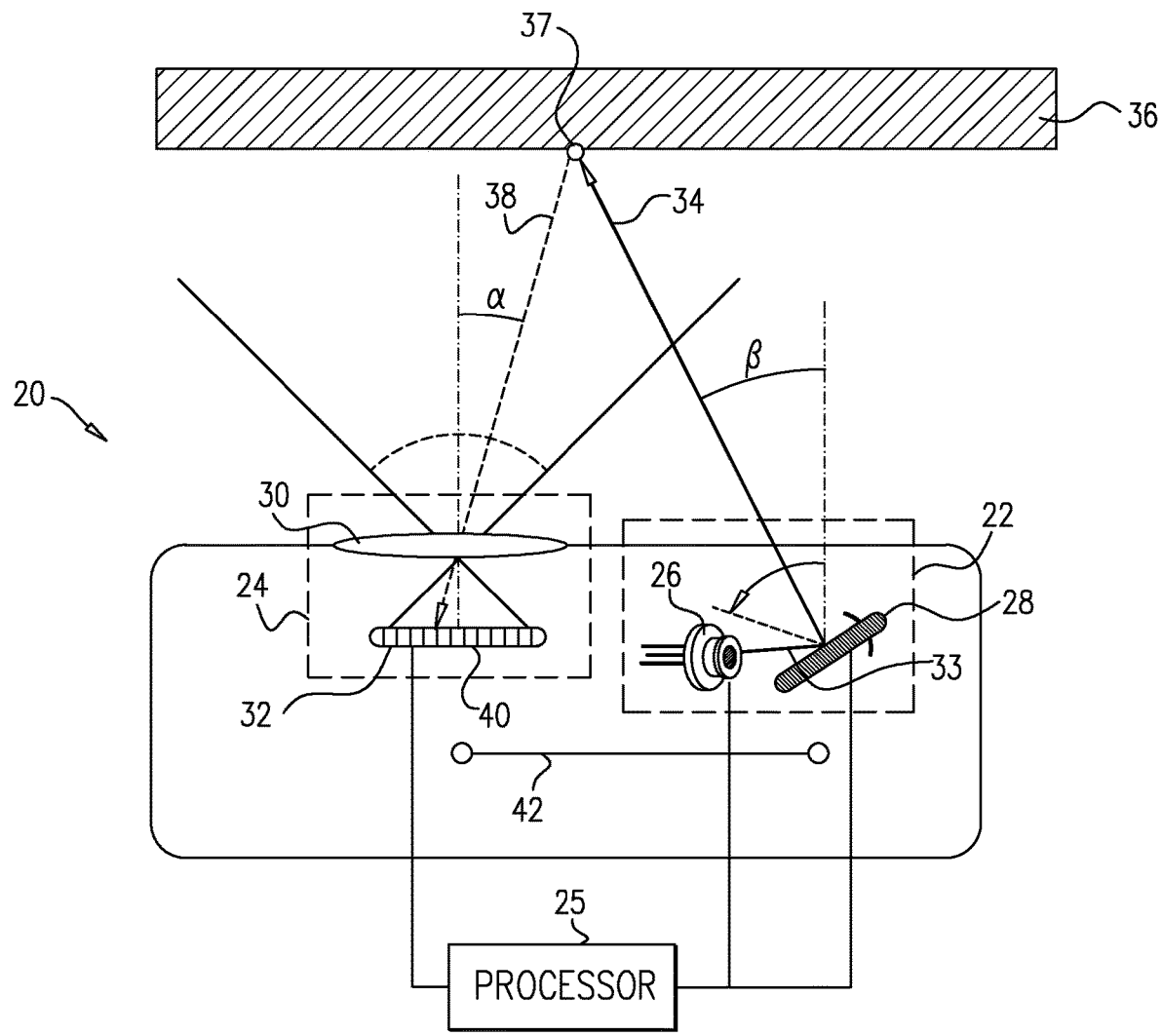
FIG. 1 is a schematic side view of an optical apparatus, in accordance with an embodiment of the invention.

Depth sensors measure the distance to each point on a target scene (target scene depth) by illuminating the target scene with one or more optical beams from a primary light source and analyzing the reflected optical signals. The terms "light" and "optical," as used in the context of the present description and in the claims, refer to optical radiation in any of the visible, infrared, and ultraviolet ranges. The optical beams may comprise either sheets of light, for example, forming one or more line patterns on the target scene, or beams forming individual spots or spot patterns on the target scene.

Using static line patterns requires a sequence of line patterns projected one after the other, with an image captured for each line pattern (for example, 10 line patterns and images). The drawbacks of this method are the spread of the illumination over a large area, leading to a low signal-to-noise ratio (SNR), and the requirement for a large number of images, leading to low speed of the 3D mapping. The use of spot patterns suffers, like static line patterns, from spreading of the illumination over a large area. An additional drawback is that of edge artifacts, due to a subset of the spot pattern landing on an edge discontinuity in the scene.

Using a scanning line concentrates the illumination on a small area, thus improving the SNR. However, this method suffers from sensitivity to both background noise and to spurious signals from the target scene.

The embodiments of the present invention that are described herein address the above limitations so as to enable fast and robust 3D mapping of target scenes. In the disclosed embodiments, a target scene is illuminated by a scanning line projector. The projector generates a line of radiation on the target scene, which is scanned continuously across the scene. Alternatively, the projector may be configured to generate and scan multiple parallel lines simultaneously. In the embodiments described below, the line of radiation is scanned across the scene in a direction perpendicular to the line, but the techniques described herein may alternatively be adapted for non-perpendicular scan directions, as well. The target scene is imaged by a receiver, comprising collection optics and an array of sensing elements.

The time-dependent waveforms of the signals from the sensing elements are monitored by a processor and compared to a waveform that would be expected from a line passing a sensing element. (The processor that performs this function may be a separate unit, or it may be integrated with the sensing elements, or it may include components that are integrated with the sensing elements and another component separate from the sensing elements.) The processor thus identifies respective times of passage of the scanned line across the points in the scene and derives depth coordinates of the points in the scene from the respective times of passage.

Specifically, when the comparison performed by the processor indicates that a line image has passed across a given sensing element, a time stamp is generated by the processor, indicating the exact time when the passage occurred. Knowing the time-dependent angular direction of the beam generating the line on the target scene, the time stamp enables the processor to determine the direction of the beam at the moment marked by the time stamp. The angular direction of the beam that generated the line image passing the given sensing element is determined by the processor from the optical geometry of the receiver. Based on these two angular directions and the known baseline between the projector and the receiver, the processor utilizes triangulation to determine the depth coordinates of the point of the target corresponding to the given sensing element. The comparison of the time-dependent waveform of the signals from the sensing elements to an expected line waveform ensures a robust identification of signals from the scanned line, and in this way enables an effective discrimination of the scanned line against background noise or spurious signals from the target scene.

In another embodiment, the projector scans two or more parallel lines at different angles in order to shorten the overall scan time.

Additionally or alternatively, the processor may control the scanner so as to synchronize the scan with a rolling shutter of the array of sensing elements.

In one embodiment, the processor compares waveforms by measuring the temporal duration of the time-dependent waveform of the signal received by a sensing element. The temporal duration may be determined, for example, from the time-difference between the leading and trailing edges of the pulse-shaped signal output by the sensing element. This temporal duration is compared to that expected from a line passing the sensing element. If the measured temporal duration matches the expected duration to within a predetermined margin, for example ±10%, the signal is deemed to originate from a passing line, and a time stamp is generated for use in triangulation. As background noise or spurious signals from the target scene do not in general generate signals within this range of duration, they are rejected.

In another embodiment, a correlation value is calculated between the time-dependent waveform of the signal and the expected line waveform. If the correlation value exceeds a predetermined threshold, for example 90%, the signal is again deemed to originate from a passing line, and a time stamp is generated for use in triangulation. Similarly to the previous embodiment, background noise or spurious signals from the target scene will in general have a very low correlation value with the expected line waveform, and they are rejected.

The above two embodiments are described here by way of example, and alternative criteria for waveform comparison that utilize at least two points on the time-dependent waveform of the signals from the sensing elements are considered to be within the scope of the present invention.

In some embodiments, the sensing elements in the array comprise fast photodiodes, with a bandwidth substantially greater than the rate of scan of the line of radiation across the sensing elements.

In one of these embodiments, the sensing elements in the array comprise single-photon detectors, such as single-photon avalanche diodes (SPADs), and the scanning line projector emits the light as high-frequency pulses. The time-dependent waveform of the signal sensed by a given sensing element in response to a passing line of radiation now comprises two components:
1. An envelope due to the shape of the line, and
2. Short pulses from the pulsed projector emission, wherein the sensed pulses are shifted from the emitted pulses by the time of flight of the optical radiation from the projector via the target scene to the receiver. As will be detailed below, several short pulses are typically contained within the envelope.

This embodiment enables the processor to construct a depth map with enhanced accuracy and reliability. The envelope of the signal is compared to an expected line waveform and a time stamp is generated, as described above, to be used in determining depth coordinates by triangulation. The shift of the short pulses, when compared to the pulses emitted by the scanning light projector, is utilized by the processor in calculating the target scene depth by the method of time-of-flight. The accuracy of triangulation is proportional to $D^2$, wherein D is the distance to the target point in the scene, whereas the accuracy of the method of time-of-flight is proportional to D. For short distances, triangulation is more accurate, but there is a cross-over point, beyond which the method of time-of-flight is more accurate. In one embodiment, the processor is configured to take advantage of the combination of the two methods, and to switch between them based on the distance to points in the scene.

As noted earlier, in some embodiments, the comparison of signals, calculation of correlations, and generation of a time stamp, as well as calculations of time-of-flight when appropriate, are performed in a centralized processor. In other embodiments, each sensing element in the array is configured to implement some or all of these functionalities. Such distributed processing assures that the array generates only signals based on passage of a line (so-called event-based signals), and thus reduces the volume of transferred data and number of calculations as compared to embodiments utilizing only a central processor.

System Description

FIG. 1 is a schematic side view of an optical apparatus 20 with a scanned line of optical radiation, in accordance with an embodiment of the invention. Optical apparatus 20 comprises a scanning line projector 22, a receiver 24, and a processor 25. Scanning line projector 22 comprises a light source 26, which comprises a laser diode and optics for shaping the laser beam into a sheet of light 33 (components not shown), and an angular scanner 28, such as a rotating mirror. Receiver 24 comprises collection optics 30 and an array of sensing elements 32. Processor 25 is coupled to light source 26, angular scanner 28, and array of sensing elements 32. Although processor 25 is shown, for the sake of simplicity, as a separate, unitary element, in practice processor 25 may comprise distributed processing components that are integrated with the sensing elements in array of sensing elements 32.

Projector 22 projects sheet of light 33 via angular scanner 28 to generate a sheet of light 34, which is scanned by angular scanner 28 in a direction perpendicular to the plane defined by sheet of light 34. Sheet of light 34 impinges on a target scene 36, forming on the target scene a line of light 37 (extending in a direction perpendicular to the page and thus seen here in cross-section), which is swept, in a direction perpendicular to the line, across target scene 36. A portion of the projected light is reflected towards receiver 24. Target scene 36 is shown here, for the sake of simplicity, as an abstract flat surface, but in general, the target that is mapped has a more complex and possibly dynamic topology. The light reflected from target scene 36 is represented by a beam 38; in reality the reflection may be either specular or diffuse. The operation of scanner 28 causes an image of line 37 to sweep across array of sensing elements 32. Thus, at the illustrated moment, the image of line 37 is formed on a sensing element 40 in array of sensing elements 32.

Processor 25 monitors continuously the time-dependent waveform of the signals output from all the sensing elements of array of sensing elements 32 and compares them to the waveform that is expected to arise from sweeping the image of line 37 across the array. For robust and reliable detection, multiple points in the output signals are used in the comparison together with multiple points in the expected waveform. Typically, both the rising and trailing sides of the waveform are used in this comparison.

When processor 25 detects, for example, that a line has swept past sensing element 40, it generates a time stamp indicating the time of passage. The time stamp is used, along with knowledge of the temporal behavior of the sweep, to determine the directional angle $\beta$ of light sheet 34 that generated the line image at sensing element 40. The position of sensing element 40 within array of sensing elements 32, together with the optical layout of receiver 24, determines the directional angle $\alpha$ of beam 38. Utilizing the values of the two directional angles $\alpha$ (for reception of beam 38) and $\beta$ (for transmission of sheet 34), together with the known length of a baseline 42 separating scanning line projector 22 and receiver 24, processor 25 calculates by triangulation the distance to the point in target scene 36 that gave rise to the signal output by sensing element 40.

In another embodiment (not shown in the figures), multiple sheets of light are emitted by scanning line projector 22, and multiple parallel lines are thus generated and scanned together simultaneously over scene 36, in a direction perpendicular to the lines. The multiple sheets of light can be generated, for example, by multiple light sources or by a single light source with suitable beamsplitting optics. Typically, the angles between the sheets of light are selected so that scanner 28 scans each beam over a different part of the scene. Processor 25 receives and processes the signals due to all of the projected lines concurrently, thus shortening the overall scan time.

Figure 2:
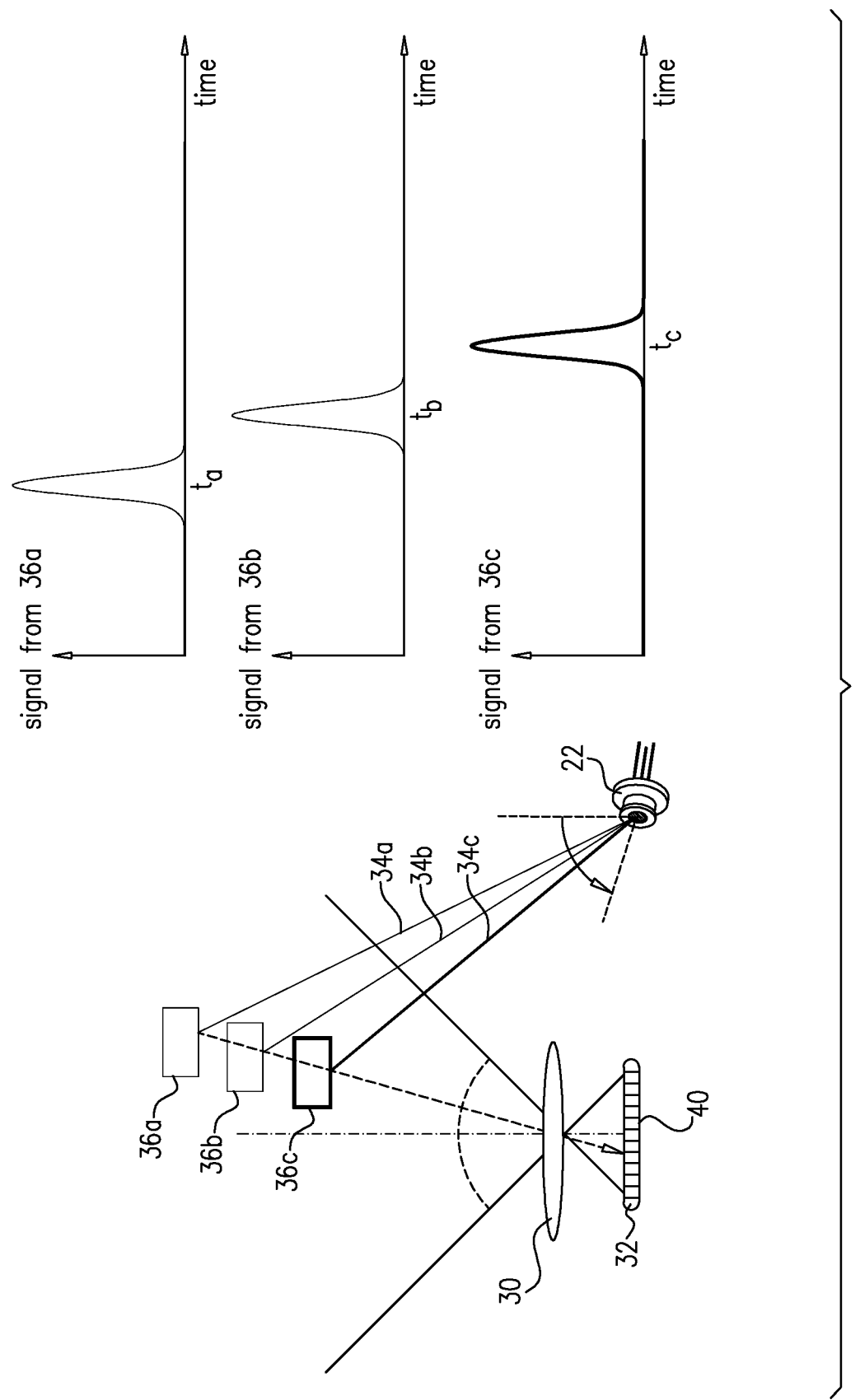
FIG. 2 is a schematic representation of the relationship between target scene depth, time stamps, and direction of scan of a line of radiation, in accordance with an embodiment of the invention.

FIG. 2 is a schematic representation of the relationship between target scene 36 depth, time stamps, and direction of light sheet 34, in accordance with an embodiment of the invention. Three different positions in target scene 36 are shown as an example: positions 36a, 36b, and 36c. By observing the time-dependent waveform of the signal at sensing element 40, three different time stamps $t_a$, $t_b$, and $t_c$, are generated from the time-dependent waveforms shown on the right, corresponding, respectively, to target scene positions 36a, 36b, and 36c. Each time stamp can now be associated with, respectively, one of light sheets 34a, 34b, and 34c, and the distance to each depth of target scene can be calculated by triangulation.

Figure 3:
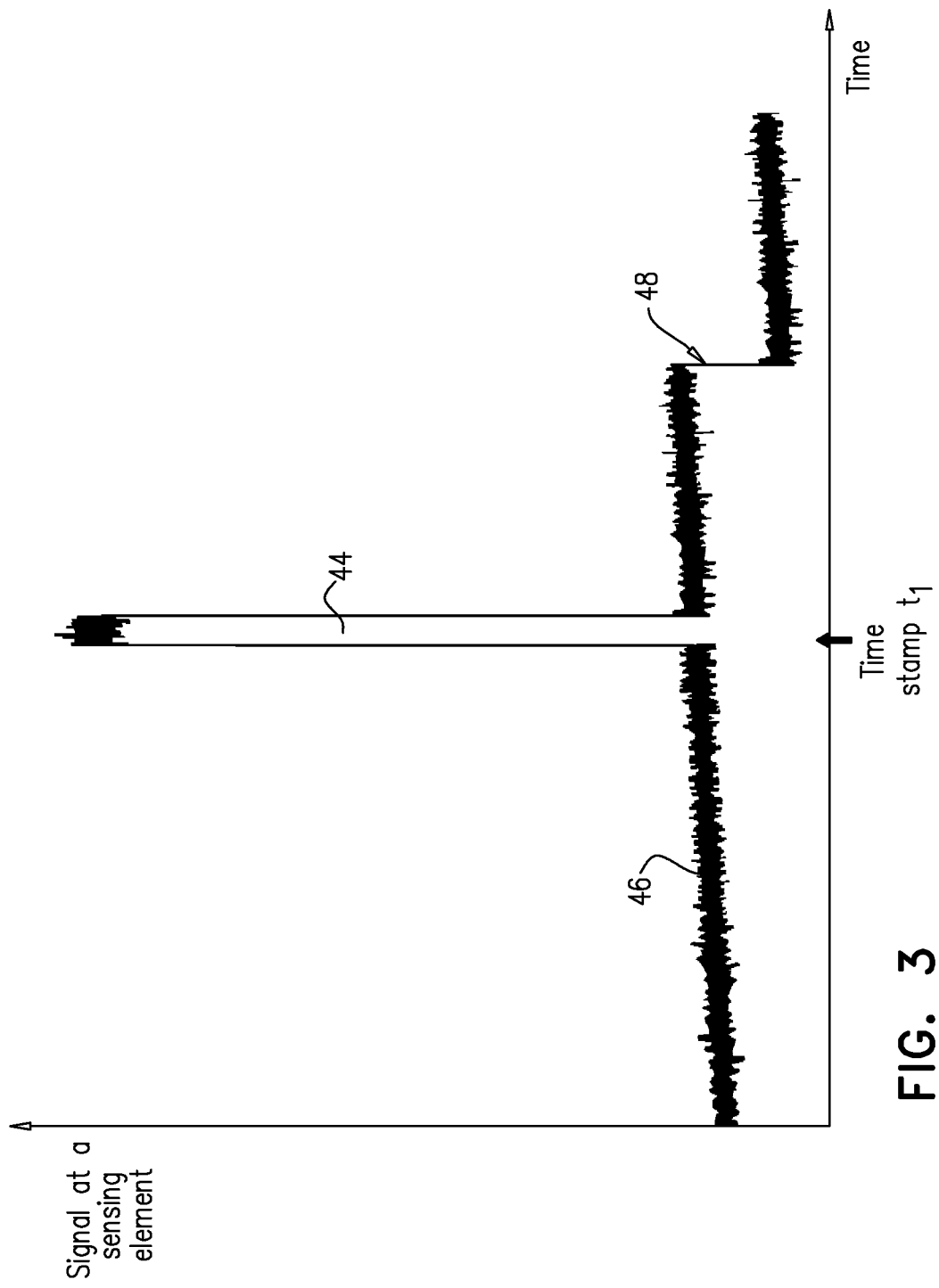
FIG. 3 is a schematic representation of a signal sensed by a sensing element, in accordance with an embodiment of the invention.

FIG. 3 is a schematic representation of a signal sensed by a sensing element in array 32, in accordance with an embodiment of the invention. The time-dependent waveform of the signal comprises a pulse 44, representing the response of the sensing element to a line of light passing across the sensing element. The waveform in this example also includes a slowly varying background signal 46 and a discontinuity 48 due to, for example, a change in the reflection from the scene.

The comparison of the signal shown in FIG. 3 to the expected waveform from a line due to passage of the image of line 37 (FIG. 1) across the sensing element will identify pulse 44 as a signal from a passing line, and will generate time stamp $t_1$. For example, processor 25 may detect both the rising edge and the falling edge of pulse 44 and may thus derive the duration of the pulse from the difference in time between the rising and falling edges (for example, between the full width at half maximum points), for comparison with the expected pulse duration. Alternatively or additionally, processor 25 may calculate a cross-correlation between pulse 44 and the expected waveform. When the width and/or the correlation satisfy a predefined threshold criterion, processor 25 generates the corresponding time stamp at the time of occurrence of pulse 44. However, discontinuity 48, when compared to an expected line waveform, will not pass the comparison test, will not be identified as a line passage, and will consequently be ignored. Background signal 46 is similarly ignored.

Figure 4:
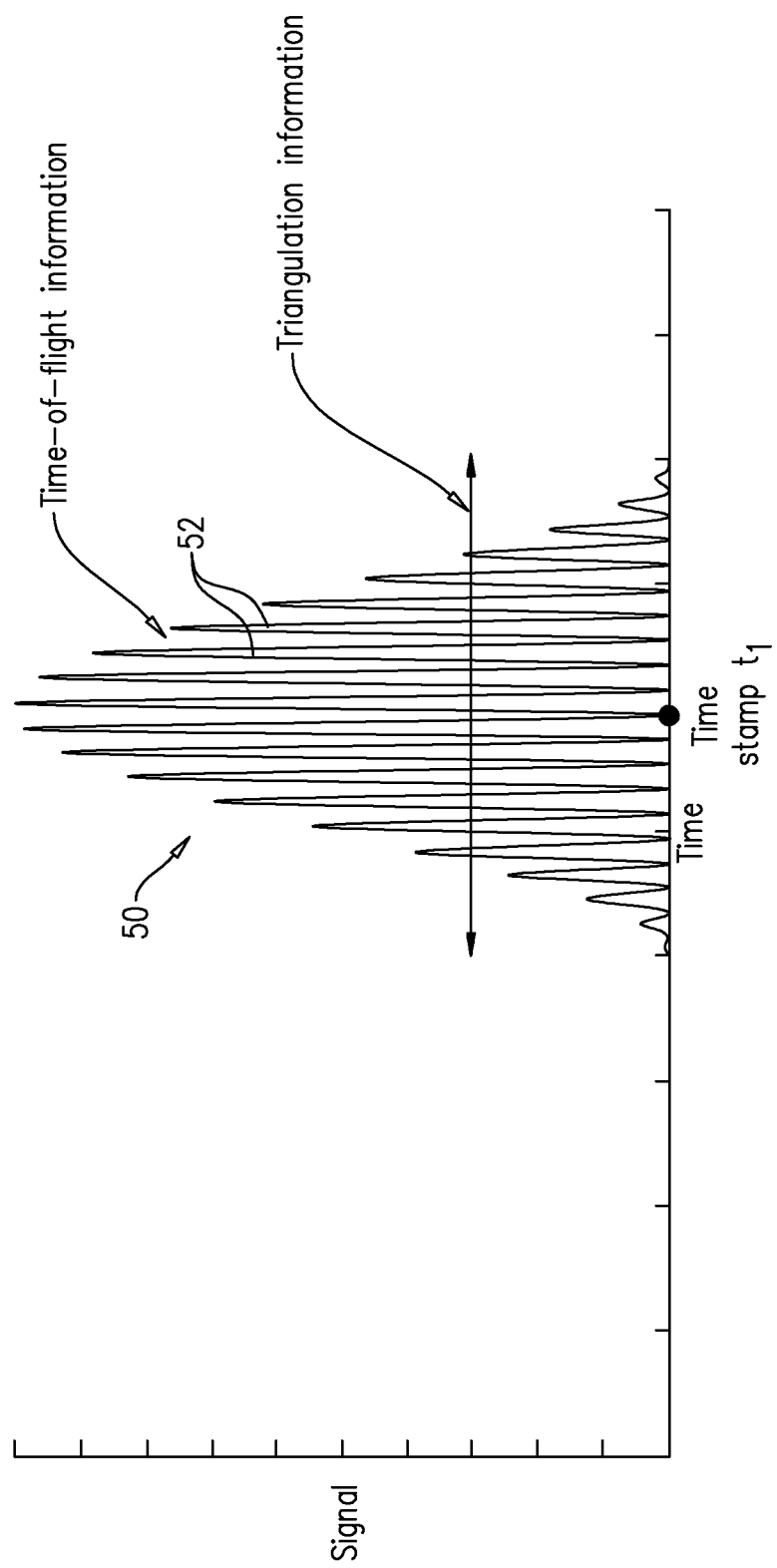
FIG. 4 is a schematic representation of a signal sensed by a sensing element, in accordance with another embodiment of the invention.

FIG. 4 is a schematic representation of a time-dependent waveform of a signal 50 sensed by a sensing element, in accordance with another embodiment of the invention. In this embodiment (referring to the elements shown in FIG. 1), light source 26 comprises a laser, which outputs a sequence of very short pulses of light (typically sub-nanosecond), so that sheet of light 34 comprises pulsed radiation, and array 32 comprises SPAD sensing elements. Signal 50 in FIG. 4 represents a time-dependent waveform generated by a SPAD sensing element in array 32 under these pulsed illumination condition. The amplitude envelope of signal 50 (not drawn explicitly) is due to the width of line 37 that is imaged onto the SPAD sensing element, while pulses 52 under the envelope are due to the pulsed light sensed by the SPAD.

The time stamp $t_1$ in this example is derived from the width of the envelope of signal 50. This time stamp is utilized in a triangulation calculation by processor 25 to find the target depth, as previously described. Additionally or alternatively, processor 25 performs time-of-flight-based depth calculation by comparing the temporal position of individual pulses 52 to the timing of the pulses emitted by light source 26. The temporal offset between the emitted pulses and received pulses 52 gives the time-delay due to the travel of the pulses from scanning line projector 22 via target scene 36 to receiver 24, and thus the depth of the scene point from which the light pulses reflected.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising:
a projector, which is configured to direct a sequence of pulses of radiation toward a scene so as to form and scan multiple lines of the radiation simultaneously across respective parts of the scene;
a receiver comprising an array of single-photon detectors, which are configured to output, in response to the radiation that is incident thereon, signals indicative of a time-of-flight of the pulses from the projector to the receiver via the points in the scene, and collection optics configured to form an image the scene on the array, including the multiple lines of the radiation, such that each single-photon detector receives the radiation reflected from a corresponding point in the scene; and
a processor coupled to receive the signals output by the single-photon detectors, and to derive depth coordinates of the points in the scene from both the time-of-flight of the pulses and triangulation of the multiple lines in the image based on an envelope of a time-dependent waveform generated by the signals output by the single-photon detectors in response to the sequence of the pulses as the lines scan across the scene.

2. The optical apparatus according to claim 1, wherein the processor comprises distributed processing components that are integrated with the single-photon detectors.

3. The optical apparatus according to claim 1, wherein the single-photon detectors comprise single-photon avalanche diodes (SPADs).

4. The optical apparatus according to claim 1, wherein the processor is configured to construct a depth map of the scene using the derived depth coordinates.

5. The apparatus according to claim 1, wherein the projector is configured to scan the multiple parallel lines in a direction perpendicular to the lines.

6. A method for sensing, comprising:
directing a sequence of pulses of radiation toward a scene so as to form and scan multiple lines of the radiation simultaneously across respective parts of the scene;
forming an image of the scene on an array of single-photon detectors, which are configured to output, in response to the radiation that is incident thereon, signals indicative of a time-of-flight of the pulses via the points in the scene, such that each single-photon detector receives the radiation reflected from a corresponding point in the scene;
receiving signals output by the single-photon detectors in response to the radiation that is incident thereon; and
processing the received signals so as to derive depth coordinates of the points in the scene from both the time-of-flight of the pulses and triangulation of the multiple lines in the image based on an envelope of a time-dependent waveform generated by the signals output by the single-photon detectors in response to the sequence of the pulses as the lines scan across the scene.

7. The method according to claim 6, wherein processing the received signals comprises processing the signals using distributed processing components that are integrated with the single-photon detectors.

8. The method according to claim 6, wherein the single-photon detectors comprise single-photon avalanche diodes (SPADs).

9. The method according to claim 6, wherein processing the received signals comprises constructing a depth map of the scene using the derived depth coordinates.

10. The method according to claim 6, wherein the multiple parallel lines are scanned in a direction perpendicular to the lines.

* * * * *